United States Patent
Chen

(10) Patent No.: US 8,055,843 B2
(45) Date of Patent: Nov. 8, 2011

(54) METHOD FOR CONFIGURING RAID

(75) Inventor: Chung-Chiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 387 days.

(21) Appl. No.: 12/482,462

(22) Filed: Jun. 11, 2009

(65) Prior Publication Data

US 2010/0250847 A1  Sep. 30, 2010

(30) Foreign Application Priority Data

Mar. 25, 2009 (TW) ................................ 98109763 A

(51) Int. Cl.
*G06F 12/00* (2006.01)
(52) U.S. Cl. ....... 711/114; 711/156; 711/170; 714/6.22; 714/6.32
(58) Field of Classification Search .................. 711/114, 711/156, 170; 714/6.22, 6.32
See application file for complete search history.

(56) References Cited

U.S. PATENT DOCUMENTS

| | | | | |
|---|---|---|---|---|
| 6,904,544 B2 * | 6/2005 | DeRolf et al. | ................... | 714/43 |
| 7,434,090 B2 * | 10/2008 | Hartung et al. | ................ | 714/6.2 |
| 2008/0244585 A1 * | 10/2008 | Candea et al. | ................ | 718/102 |
| 2009/0271659 A1 * | 10/2009 | Troppens et al. | ................. | 714/7 |
| 2010/0185899 A1 * | 7/2010 | Chen | .............................. | 714/42 |

* cited by examiner

*Primary Examiner* — Stephen Elmore
(74) *Attorney, Agent, or Firm* — CKC & Partners Co., Ltd.

(57) ABSTRACT

A method for configuring a RAID (Redundant Array of Inexpensive Disks) includes the following steps. When a RAID instruction to access the RAID array is received, it is determined whether a removed hard drive unconnected to the RAID array is present in a hard drive list of the RAID array; when the removed hard drive unconnected to the RAID array is present in the hard drive list, the hard drive list of the RAID array is amended; it is detected whether a new hard drive connected to the RAID array is absent in the hard drive list; when the new hard drive connected to the RAID array is absent in the hard drive list, the hard drive list is amended; and the RAID instruction is executed to access the RAID array according to the hard drive list.

9 Claims, 1 Drawing Sheet

METHOD FOR CONFIGURING RAID

RELATED APPLICATIONS

This application claims priority to Taiwan Application Serial Number 98109763, filed Mar. 25, 2009, which is herein incorporated by reference.

FIELD OF THE INVENTION

This invention relates generally to a method for configuring a redundant array of inexpensive disks (RAID), and more particularly, to a method for configuring a RAID with a hot-plug function.

BACKGROUND OF THE INVENTION

Depending on more and more popular computers, the data saved in the computers by people is increasingly huge, so that computer manufacturers must be continuously engaged in development of larger-capacity storage media. However, the large-capacity storage media such as hard drives are generally limited on data transmission rate due to their reading heads with accessing rate and the transmission rate of the bus connecting thereto. In addition, once the storage media that have no error-tolerance function are destroyed, the stored data will also be destroyed.

Accordingly, the redundant array of inexpensive disks (RAID) is developed, which is a virtual logic hard drive stimulated by several physical hard drives. The RAID array can simultaneously access data from several physical hard drives, so that the virtual logic hard drive has a faster data transmission rate. Besides, some RAID arrays have error-tolerance function, when one of the physical hard drives of the RAID array is broken, the data in the broken physical hard drive can be recovered from the other physical hard drives.

For replacing the physical hard drives of the RAID array at any time, the hot-plug physical hard drive is essential to RAID array. However, when software is applied to emulate RAID array, it is necessary to monitor and to deal with plug in or out of the physical hard drive under the circumstance with RAID drivers at any time.

SUMMARY OF THE INVENTION

Accordingly, it is an aspect of the present invention to provide a method for configuring a RAID, which is performed by detecting whether a new hard drive or a removed hard drive connected to a corresponding connection port of the RAID array when a RAID instruction to access the RAID array is received. Thereby, the RAID array is facilitated to deal with the hot-plug hard drive, instead of detecting the plug in or out of the hard drives at any time.

According to an embodiment of the present invention, the method for configuring a RAID may include the following steps. When a RAID instruction to access the RAID array is received, it is determined whether a removed hard drive unconnected to die RAID array is present in a hard drive list of a RAID array. When the removed hard drive unconnected to the RAID array is present in the hard drive list, the hard drive list of the RAID array is amended. Next, it is detected whether a new hard drive connected to the RAID array is absent in the hard drive list. When the new hard drive connected to the RAID array is absent in the hard drive list, the hard drive list is amended. And then, the RAID instruction is executed to access the RAID array according to the hard drive list of the RAID array.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
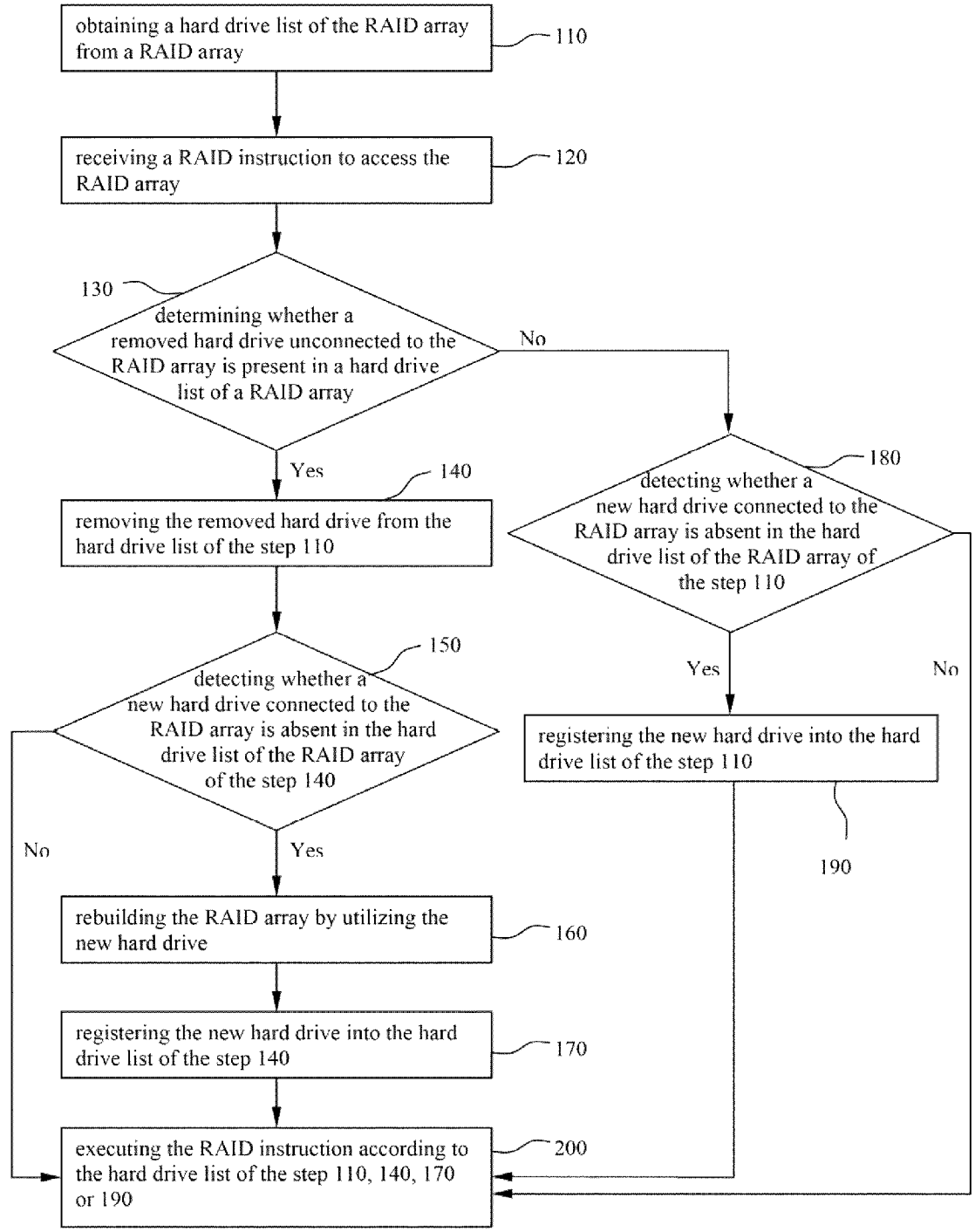
FIG. 1 depicts a flowchart of a method for configuring a RAID according to an embodiment of the present invention.

Reference is made to FIG. 1, which depicts a flowchart of a method for configuring a RAID according to an embodiment of the present invention. The method for configuring the RAID is performed by detecting whether a new hard drive or a removed hard drive connected to a respective connection port of the RAID array, for providing capability of dealing with hot-plug hard drive. The method for configuring the RAID 100 may include the following steps.

In the step 110, a hard drive list of the RAID array is obtained from at least one hard drive connected to a RAID array, in which the hard drive list is applied in mini-RIS (RAID Information Sectors) format or other RAID array default formats, and the hard drive list has at least one information of the previous hard drive connected to the RAID array stored therein, for instance, the identification code of the previous hard drive, information involved in connection ports of the RAID array for connecting to the previous hard drive, or other information related to the previous hard drives.

Next, when a RAID instruction to access the RAID array is received (step 120), it is determined whether a removed hard drive unconnected to the RAID array is present in a hard drive list of a RAID array (step 130). The step 130 can be carried out by scanning at least one connection port of the RAID array according to at least one connection port information of at least one previous hard drive in the hard drive list, in which a bus instruction applied to scan the RAID array can be, for example, serial advanced technology attachment (SATA) or other bus instructions. When no hard drive is scanned on the connection port connected to the previous hard drive on the RAID array, it is determined that a removed hard drive unconnected to the RAID array is present in the hard drive list.

When the removed hard drive unconnected to the RAID array is present in a hard drive list, the removed hard drive can be removed from the hard drive list (step 140), so as to amend the hard drive list of the step 110. Therefore, it prevents the system from failure due to accessing the removed hard drive.

In the step 150, it is detected whether a new hard drive connected to the RAID array is absent in the hard drive list of the RAID array of the step 140. The step 150 can be accomplished by scanning at least one connection port of the RAID array, in which a bus instruction applied to scan the RAID array can be, for example, SATA or other bus instruction. When at least one connection port is scanned which has no hard drive connecting thereto earlier in the previous hard drive list but a hard drive connecting thereto later, it is determined that a new hard drive connected to the RAID array is absent in a hard drive list.

When there is no new hard drive connected to the RAID array, the RAID instruction is executed to access the RAID array (step 200) according to the hard drive list of the RAID array. Therefore, the removed hard drive from the hard drive list is removed (step 140) and then the RAID instruction is executed (step 200) according to the amended hard drive list of the RAID array, which prevents the system from accessing the removed hard drive and makes the method 100 for configuring the RAID deal with the hot-plug hard drive.

However, when a new hard drive is connected to the RAID array, the RAID array can be rebuilt by utilizing the new hard drive (step 160), in which a rebuilt block may be configured in the new hard drive, and at least one source hard drive is selected from the RAID array. And then, a rebuilt data from the source hard drive is obtained and saved into the rebuilt block of the new hard drive, so as to rebuild the RAID array by utilizing the new hard drive (step 160).

After rebuilding the RAID array by utilizing the new hard drive (step 160), the new hard drive is registered into the hard drive list of the step 140 (step 170), and the RAID instruction is executed (step 200) to access the RAID array according to the hard drive list of the step 170. Hence, during accessing the RAID array, the new hard drive can be accessed immediately, so that the RAID process method 100 can deal with the hot-plug hard drive.

In addition, during the step 130 for determining that at least one previous hard drive is present in the hard drive list and connected to the RAID array, it may be detected whether the new hard drive connected to the RAID array is absent in the hard drive list (step 180). When there is no new hard drive connected to the RAID array, the RAID instruction is executed (step 200) according to the current hard drive list of the step 110. While the new hard drive connected to the RAID array is absent in the hard drive list, the new hard drive is registered into the hard drive list (step 190) for amending the hard drive list of the step 110, and the RAID instruction is executed (step 200) to access the RAID array according to the amended hard drive list of the step 190.

According to the embodiment of the present invention, the method for configuring the RAID of the present invention beneficially has the function of dealing with the hot-plug hard drive, which is carried out by detecting whether a new hard drive is present or a removed hard drive is absent in the RAID array when the RAID array instruction is received. Besides, the method for configuring the RAID of the present invention can rebuild the RAID array by utilizing the new hard drive when a hard drive is removed from the RAID array. Thereby, the method for configuring the RAID of the present invention can deal with the hot-plug hard drive without RAID array driver or RAID control card that is applied for monitoring whether a hard-plug hard drive is present in the RAID array at any time. Accordingly, when the RAID array is simulated by software, the method for configuring the RAID of the present invention can still be applied under the circumstance without RAID array driver, for example, under the circumstance executed by DOS or firmware.

As is understood by a person skilled in the art, the foregoing embodiment of the present invention is illustrated of the present invention rather than limiting of the present invention. It is intended to cover various modifications and similar arrangements included within the spirit and scope of the appended claims. Therefore, the scope of which should be accorded to the broadest interpretation so as to encompass all such modifications and similar structure.

What is claimed is:

1. A method for configuring a RAID (redundant array of inexpensive disks), comprising:
    determining whether a removed hard drive unconnected to the RAID array is present in a hard drive list of a RAID array when a RAID instruction to access the RAID array is received;
    amending the hard drive list of the RAID array when the removed hard drive unconnected to the RAID array is present in the hard drive list of the RAID array;
    detecting whether a new hard drive connected to the RAID array is absent in the hard drive list of the RAID array;
    amending the hard drive list when the new hard drive is connected to the RAID array; and
    executing the RAID instruction to access the RAID array according to the hard drive list of the RAID array.

2. The method for configuring the RAID according to claim 1, when the removed hard drive unconnected to the RAID array is present in the hard drive list, the step of amending the hard drive list further comprises:
    removing the removed hard drive from the hard drive list, so as to amend the hard drive list when the removed hard drive unconnected to the RAID array is present in the hard drive list.

3. The method for configuring the RAID according to claim 1, when the new hard drive is connected to the RAID array, the step of amending the hard drive list further comprises:
    registering the new hard drive into the hard drive list, so as to amend the hard drive list when the new hard drive is connected to the RAID array.

4. The method for configuring the RAID according to claim 1, further comprising:
    rebuilding the RAID array by utilizing the new hard drive when there are the removed hard drive unconnected to the RAID array and the new hard drive connected to the RAID array present in the hard drive list.

5. The method for configuring the RAID according to claim 4, wherein the step of reconstructing the RAID array by using the new hard drive further comprises:
    configuring a rebuilt block in the new hard drive;
    selecting at least one source hard drive from the RAID array; and
    obtaining a rebuilt data from the source hard drive and saving the rebuilt data into the rebuilt block of the new hard drive, so as to rebuild the RAID array by utilizing the new hard drive.

6. The method for configuring the RAID according to claim 1, wherein the step of determining whether the removed hard drive is unconnected to the RAID array present in the hard drive list of the RAID array further comprises:
    scanning at least one connection port of the RAID array according to at least one connection port information of at least one previous hard drive in the hard drive list, so as to determine whether the removed hard drive is unconnected to one of the at least one connection port of the RAID array.

7. The method for configuring the RAID according to claim 1, wherein the step of detecting whether the new hard drive connected to the RAID array is absent in the hard drive list of the RAID array further comprises:
    scanning at least one connection port of the RAID array, so as to detect whether the new hard drive connected to one of the at least one connection port of the RAID array is absent in the hard drive list.

8. The method for configuring the RAID according to claim 1, further comprising:
    obtaining the hard drive list of the RAID array from at least one hard drive connected to the RAID array.

9. The method for configuring the RAID according to claim 1, wherein the hard drive list is applied in mini-RIS (RAID Information Sectors) format.

* * * * *